Aug. 4, 1953         A. A. LOMBARD           2,647,684
                     GAS TURBINE ENGINE
Filed March 8, 1948                        3 Sheets-Sheet 1

INVENTOR
ADRIAN A. LOMBARD
BY Wilkinson & Mawhinney
ATTORNEYS

Aug. 4, 1953　　　A. A. LOMBARD　　　2,647,684
GAS TURBINE ENGINE
Filed March 8, 1948　　　　　　　　　　　　　　3 Sheets-Sheet 2

INVENTOR
ADRIAN A. LOMBARD
BY
ATTORNEYS

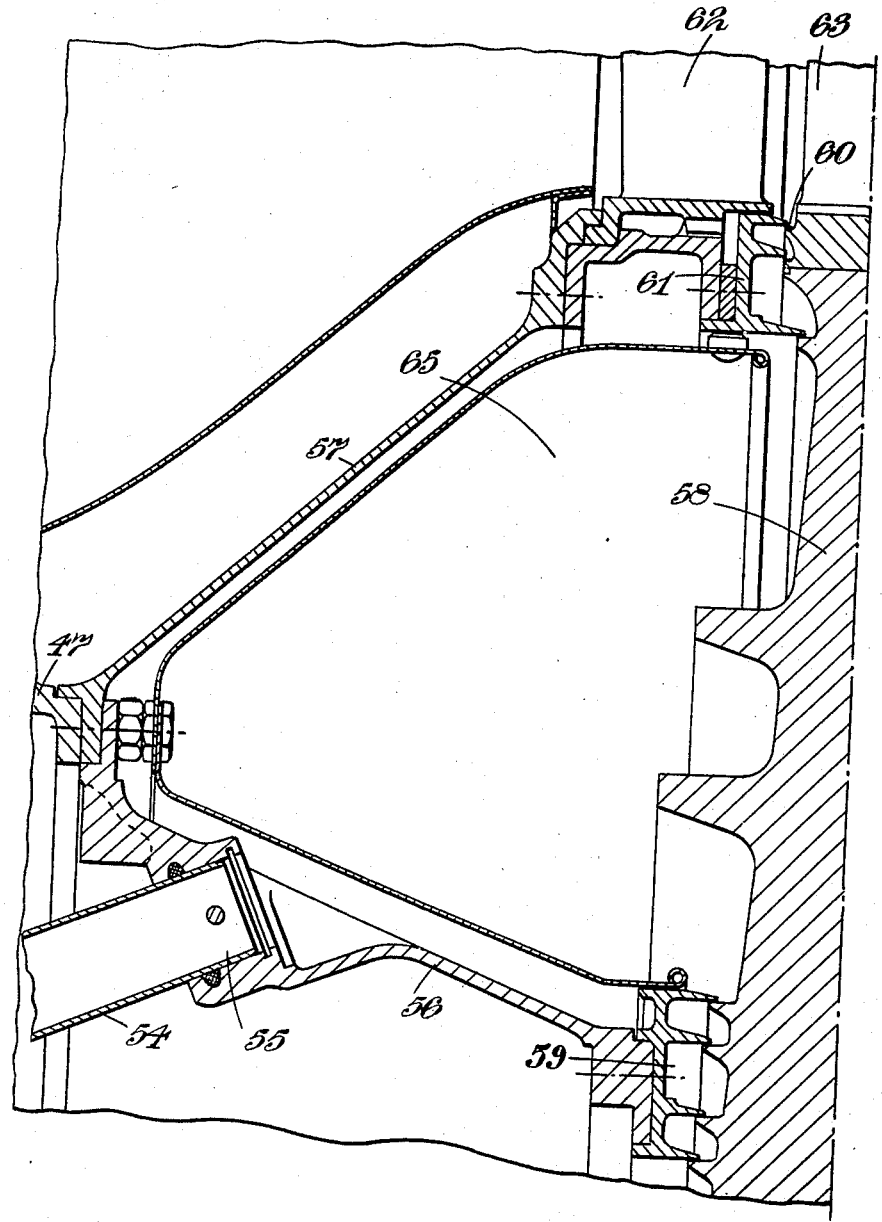

Patented Aug. 4, 1953

2,647,684

UNITED STATES PATENT OFFICE 2,647,684

GAS TURBINE ENGINE

Adrian Albert Lombard, Allestree, England, assignor to Rolls-Royce Limited, Derby, England, a British company Application March 8, 1948, Serial No. 13,585
In Great Britain March 13, 1947

1 Claim. (Cl. 230—116)

This invention relates to gas-turbine-engines and is primarily though not exclusively concerned with gas-turbine-engines for use in aircraft.

In such engines, the turbine rotor blading is supported on a disc and between the disc periphery and a stationary part of the engine casing there is a seal having a clearance between the moving and stationary parts. Therefore, since the pressure upstream of the blading is in excess of atmospheric pressure, there will be a tendency for hot combustion gases to flow radially inwards through the seal clearance into the interior of the casing. This inward flow of the hot combustion gases is overcome by supplying air under pressure to the interior of the casing, and the air supply has hitherto been derived from an auxiliary fan or compressor, or by bleeding air off from the main compressor.

An object of the present invention is to avoid the need for providing such an additional compressor or auxiliary fan or for bleeding the main compressor in a manner which may adversely effect the overall efficiency of the engine.

According to this invention in one aspect, in a gas-turbine-engine, there is provided sealing means between the outlet end of the compressor-rotor and the engine casing, and means whereby air leaking through the sealing means from the compressor outlet is employed for preventing the inward flow of hot combustion gases over the front face of the turbine disc. Conveniently, the sealing means from which the leakage air is derived is the labyrinth seal or the like such as is normally provided between the compressor-rotor and the engine-casing. Heretofore, air leaking through this labyrinth seal has been allowed to pass to the atmosphere. By employing this air leakage for sealing the turbine, the need for an auxiliary fan or compressor or for bleeding the main compressor, is avoided.

According to a feature of this invention, the sealing means is located intermediate the compressor outlet and a substantially closed chamber formed between the outlet end of the compressor rotor and the engine casing so that leakage air flows into the chamber and the air from this chamber is conveyed from the chamber to adjacent the clearance between the turbine disc and the engine casing.

According to yet another feature of this invention, the clearance gap is arranged to open into a chamber bounded by a portion of the turbine disc face and by the engine casing and this chamber is connected to the substantially closed chamber so that the leakage air flows from the latter chamber to the former.

According to another feature of this invention, the pressure air for preventing leakage of hot combustion gases is also arranged to act on an area of the front face of the turbine disc for balancing axial loads on the disc.

In gas-turbine-engines, moreover, particularly such engines having an axial compressor, the pressures acting on the compressor-rotor give rise to an axial load, which tends to move the compressor-rotor forwards, i. e. towards the inlet end of the compressor. To balance such axial load a balancing piston may be provided which is subjected to pressure from the main compressor system in such a manner as to give rise to a rearward axial load on the compressor-rotor wholly or partially balancing the forward axial load.

Accordingly in a preferred construction of gas-turbine-engine there is provided in rotative association with the compressor rotor a load-balancing piston which is subjected to high-pressure air derived from the compressor to produce a rearward axial load wholly or partially to balance the forward axial loads on the compressor rotor.

Where the gas-turbine-engine has an axial compressor the axial load due to leakage of air through the sealing means will normally be additive to the forward axial load arising from the pressure loading on the compressor-rotor blading and the load-balancing piston will be so arranged as to provide an axial load in the reverse direction wholly or partially balancing the total axial load in the forward direction.

Moreover, where the compressor rotor and turbine rotor are carried on coaxial shafts drivingly connected through a coupling, which is conveniently a universal coupling device, it is arranged that during running of the engine the coupling is in tension or compression so that in effect the axial loads on the completed rotor assembly are balanced.

There will now be described one construction of gas-turbine-engine embodying the invention. The description has reference to the accompanying drawings in which:

Figures 2 and 3 illustrate sectionally practical constructions of parts of the engine.

Figure 1:
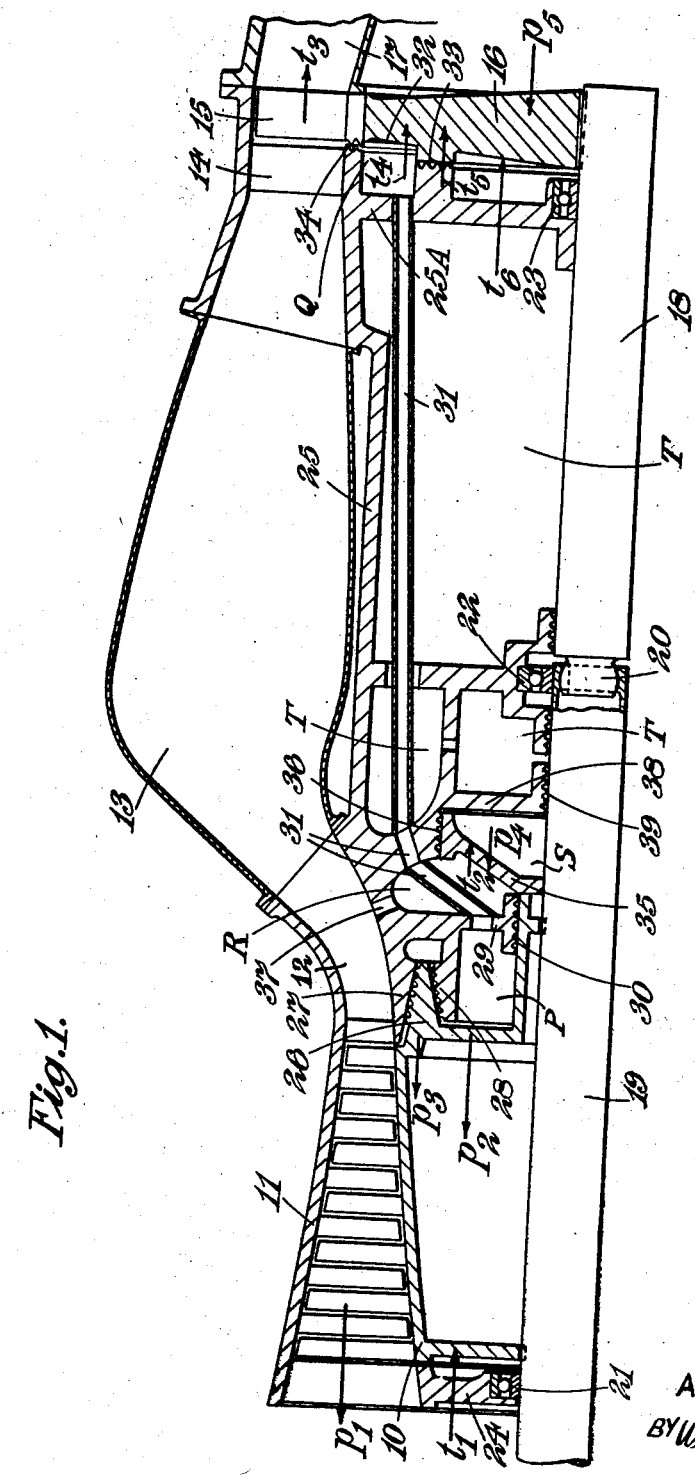
Figure 1 is a diagrammatic sectional view of the gas-turbine-engine.

Referring to the drawing, the engine comprises an axial-type compressor having rotor blading carried by a rotor drum 10 and stator blading carried by an outer casing 11. The compressor receives air substantially at atmospheric pressure at its inlet and delivers air at elevated pressure through ducts 12 to combustion chambers 13, in which liquid fuel is burnt. The products of combustion pass to a nozzle guide vane assembly 14, directing the gases on to the turbine rotor blades 15 which are mounted on the periphery of a turbine rotor disc 16. The exhaust gases from the turbine pass to atmosphere through an exhaust assembly 17.

The turbine rotor disc 16 is secured to a shaft 18, which is co-axial with a shaft 19 and is drivingly connected to the shaft 19 by a coupling 20 permitting a degree of universal relative angular movement between the shafts 18 and 19. The shaft 19 drives the compressor rotor drum 10.

The rotor assembly constituted by shafts 18 and 19, compressor rotor drum 10 and turbine disc 16 is supported by bearings 21, 22 and 23, of which bearing 22 at least is capable of withstanding axial thrusts on the rotor assembly. The bearing 21 is mounted in a bearing support 24 located in the outer casing 11 of the compressor by radially extending struts and the bearing 23 is mounted in a wall 25A forming part of an intermediate casing 25 which extends between the compressor and turbine and lies inside the combustion chambers 13 but outside the shafts 18, 19.

The gas-turbine-engine above described may be employed as a pure jet-propulsion engine in which the exhaust gases from the exhaust assembly 17 are directed rearwardly for reaction propulsion, or the turbine in addition to driving the compressor may drive an airscrew or ducted fan.

Turning now to the application of the present invention to the gas-turbine-engine as above described, the compressor rotor drum 10 is provided at its outlet end with an annular axial extension 26 formed with labyrinth grooves on its inner and outer faces which co-operate respectively with complementary labyrinth formations on a nonrotating structure as indicated at 27 and 28 to form a seal between the stationary and rotating structure. A further labyrinth seal is provided between a portion 29 of the stationary structure and a sealing surface 30 rotating with the compressor rotor 10. This arrangement of the labyrinth seals between the outlet end of the compressor drum 10 and stationary structure in effect forms a substantially closed chamber P, of annular form which is sealed at its inner radius through the medium of the labyrinth seal between the portion 29 and the surface 30 and receives pressure air by leakage from the compressor outlet through the labyrinth seal 26, 27, 28. Ducting 31 is provided connecting chamber P with an annular chamber Q which is formed between the peripheral portion of the front surface 32 of the turbine disc 16 and the wall 25A. The chamber Q is sealed at its inner radius by a labyrinth seal 33 provided between the turbine disc 16 and the wall 25A and communicates through the non-contacting seal 34 between the periphery of the turbine disc 16 and the turbine stationary structure with the space intermediate the blading of the nozzle guide vane assembly 14 and the turbine rotor blading 15.

It will be appreciated that, in operation of the gas-turbine-engine, the combustion products after passing through the nozzle guide vane assembly 14 are at a lower pressure than the delivery pressure of the compressor, but at a higher pressure than that existing within the intermediate casing 25. Therefore, due to the leakage of pressure air into chamber P and from chamber P to chamber Q, the pressure in chamber Q is in excess of the pressure existing between the fixed blading of the nozzle guide vane assembly 14 and the moving blading 15. An outward flow of air will therefore occur through clearance gap 34 preventing an inward flow of hot gas over the front face of the turbine disc. The chamber Q also functions as described below in greater detail to apply an axial load to the turbine disc, partially balancing axial forces acting on the turbine disc.

From the foregoing description, it will be clear that the invention provides a supply of pressure air to the turbine disc 16 for preventing the inward flow of hot gases, by employing for this purpose leakage air which would otherwise pass to atmosphere, and therefore that the need for providing an auxiliary compressor or fan or for bleeding the main compressor is avoided. The efficiency of the engine can thus be improved.

If the axial loads acting on the rotor assembly are considered, it will be seen that with the arrangement described above there is a resultant axial forward load. For the purpose of balancing this forward load, there is provided according to an important feature of this invention a balancing piston 35 which rotates with the compressor rotor shaft 19. A labyrinth seal 36 is provided between the periphery of the balancing piston 35 and the stationary structure of the engine. The balancing piston 35 and the stationary structure define between them a chamber R and this chamber is fed with pressure air from the compressor outlet through a duct or port 37. Chamber R is sealed by labyrinth seal between the portion 29 and surface 30 with respect to chamber P and by labyrinth 36 with respect to a chamber S which is vented to atmosphere. A wall 38 extends radially inwards from the intermediate casing 25 to a labyrinth seal 39 formed between the wall 38 and the shaft 19, thereby sealing the chamber S from the inter-communicating spaces T in the intermediate casing 25 and preventing passage of air from chamber S to the spaces T. This is desirable since the high pressure air passing through the duct 37 is at an elevated temperature, and since it is desirable to maintain spaces T at a low temperature to permit cooling of the bearing 22.

The pressure in chamber R acting on balancing-piston 35 provides a rearward axial load, opposing the resultant forward axial force otherwise arising on the rotor assembly.

If it assumed that the axial loads on the rotor assembly include the following:

$p_1$ Forward axial load on the compressor rotor due to pressure on the rotor blading;

$p_2$ Forward axial load on the compressor rotor due to pressure in chamber P operating on the end of the rotor drum 10;

$p_3$ Forward axial load on the compressor rotor due to air pressure in labyrinth seal 26, 27, 28;

$p_4$ Forward axial load due to the substantially atmospheric pressure operating on balancing piston 35;

$p_5$ Forward axial load on disc 16 due to the pressure within the exhaust assembly 17;

$t_1$ Rearward axial load on the compressor rotor due to the substantially atmospheric pressure operating on forward facing area of compressor rotor and due to the pressure in the compressor acting on the conical surface of the rotor drum;

$t_2$ Rearward axial load on the compressor rotor due to compressor outlet pressure acting on piston 35;

$t_3$ Rearward axial load on the turbine rotor blades 15;

$t_4$ Rearward axial load on the turbine rotor due to pressure in chamber Q operating on turbine disc surface 32;

$t_5$ Rearward axial load on the turbine rotor due to pressures within the labyrinth seal 33;

$t_6$ Rearward axial load on the turbine rotor due to substantially atmospheric pressure operating on turbine disc 16, then by appropriately dimensioning the effective areas upon which the respective pressures operate, the sum of loads $p_1$, $p_2$, $p_3$, $p_4$ and $p_5$ can be made substantially equal to the sum of loads $t_1$, $t_2$, $t_3$, $t_4$, $t_5$ and $t_6$ so that the overall axial loads on the rotor assembly are balanced. There may, however, be an out-of-balance as between the compressor-rotor and the turbine rotor so that the coupling 20 is subject to compression or tension.

In certain cases, it may be desirable and practicable to balance the loads acting on the compressor rotor drum 10 and the loads acting on the turbine disc 16 independently of one another, i. e so there is no tension or compression transmitted through the coupling 20. In such a case the areas on which act the pressures giving rise to the loads above listed, will be selected such that the summation $p_1+p_2+p_3+p_4$ will substantially equal the summation $t_1+t_2$ and such that $p_5$ will substantially equal the summation $t_3+t_4+t_5+t_6$.

Figure 2:
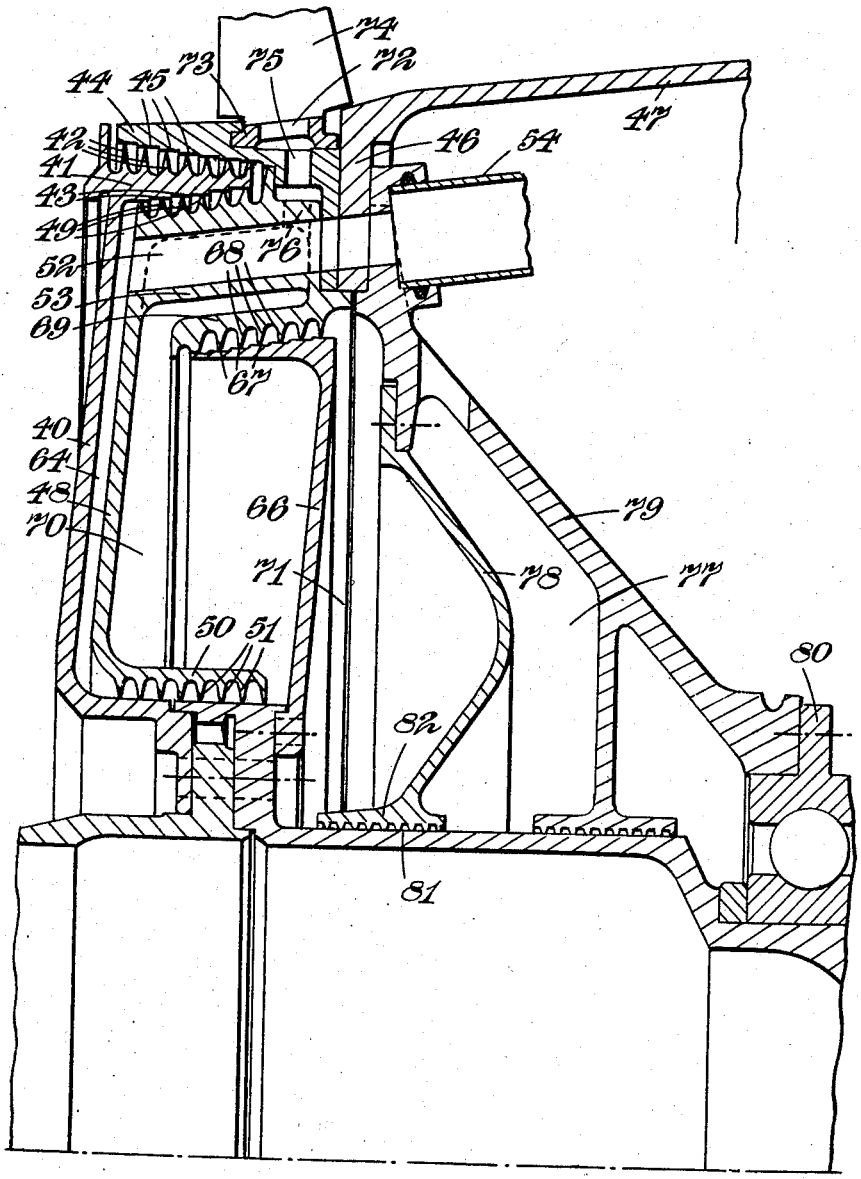

Referring now to Figures 2 and 3, there is illustrated in section one practical construction of the parts of a gas-turbine-engine embodying the foregoing features of this invention. In this construction, the compressor rotor (Figure 2) comprises an end-plate 40 forming the outlet end surface of the rotor drum and the end plate has formed on it near its periphery an axial extension 41 having a series of circumferential ribs 42 on its outer surface and stepped lands 43 on its inner surface. The extension is encircled by a stationary outlet-guide-vane-supporting ring 44 which is formed on its inner surface with stepped lands 45 to cooperate with the ribs 42 to form one part of a labyrinth seal.

The ring 44 abuts against a radial web 46 on the intermediate casing 47 of the engine and also supports internally a dished plate 48 provided on its outer periphery with ribs 49 to co-operate with the lands 43, to complete the labyrinth seal indicated by references 26, 27, 28 in Figure 1. The plate 48 is formed centrally with a neck 50 having ribs 51 cooperating with cylindrical surfaces on the rotor assembly to provide a labyrinth seal corresponding to the seal 29, 30 of Figure 1. The space 64 between the end plate 40 of the compressor drum and the plate 48 is therefore closed and receives pressure air through the seal 42, 45, 43, 49.

An outlet 52 is formed in a swelling 53 on the plate 48 to communicate with a pipe 54 leading to an outlet 55 (Figure 3) opening to the space 65 between inner and outer walls 56, 57 secured to the intermediate casing 47, and the turbine disc 58. A labyrinth seal 59 is provided between the wall 56 and the turbine disc 58 and the clearance 60 between the periphery of the turbine disc and a sealing ring 61 supported by wall 57 forms an outlet from said space to between the nozzle guide vane assembly 62 and the turbine blading 63.

Bolted to the compressor rotor assembly, there is a peripherially flanged disc 66 constituting a balancing piston, and the periphery of the disc is formed with stepped lands 67 to cooperate with ribs 68 on an annular flange 69 carried by plate 48 to form a labyrinth seal between the space 70 and the space 71 which is vented to atmosphere. The space 70 is fed with pressure air from the compressor outlet through channels 72 in the platforms 73 of the guide blades 74, ports 75 in the ring 44, and ports 76 in the plate 48.

The space 71 is closed off from the space 77 by a dished disc 78 bolted to the support 79 of the centre bearing 80, and by a labyrinth seal 81 formed between a flange 82 on the inner periphery of the member 78 and the shaft of the compressor drum.

The areas of the parts of the rotor assembly on which the pressure in spaces 64, 65, 70, 71 act are designed to fulfil the balancing conditions described above.

I claim:

A gas turbine engine comprising in combination a compressor the type having a compressor rotor on which an axial thrust is developed during operation towards its inlet, said compressor also having compressor stationary structure, first sealing means between said compressor rotor and said compressor stationary structure to impede the leakage of fluid compressed by said compressor, a first chamber formed by said compressor rotor and said compressor stationary structure on the side of said first sealing means remote from the outlet of the compressor and located to receive leakage fluid leaking through said first sealing means, a turbine having a turbine stationary structure, a turbine rotor and turbine blades on the periphery of said rotor, said turbine stationary structure defining in combination with the turbine rotor a second chamber between said turbine stationary structure and said turbine rotor and said turbine including a working fluid passage in which said blades are situated, second noncontacting sealing means between the periphery of said turbine rotor and said turbine stationary structure and separating said second chamber from said working fluid passage at a place where the pressure in said working fluid passage is less than that of the leakage fluid in said first chamber, conduit means connecting said first chamber to said second chamber, a balancing piston connected to and rotating with the compressor rotor, a third chamber on the side of said balancing piston nearer the compressor inlet, and second conduit means between the outlet of the compressor and said chamber whereby an axial load is produced on the compressor rotor in the direction towards the compressor outlet which assists in balancing the axial loading of said rotor.

ADRIAN ALBERT LOMBARD.

References Cited in the file of this patent

UNITED STATES PATENTS

| Number | Name | Date |
|---|---|---|
| 1,926,225 | Birmann | Sept. 12, 1933 |
| 2,410,769 | Baumann | Nov. 5, 1946 |
| 2,432,359 | Streid | Dec. 9, 1947 |

OTHER REFERENCES

Aviation (Magazine), pages 127–130, November 1945.